SWITCHING CIRCUIT FOR A COLOR-TELEVISION RECEIVER

Filed Aug. 10, 1954

2,841,642

SWITCHING CIRCUIT FOR A COLOR-TELEVISION RECEIVER

Donald Richman, Fresh Meadows, N. Y., assignor to Hazeltine Research, Inc., Chicago, Ill., a corporation of Illinois

Application August 10, 1954, Serial No. 448,890

5 Claims. (Cl. 178—5.4)

Figures 1, 2:
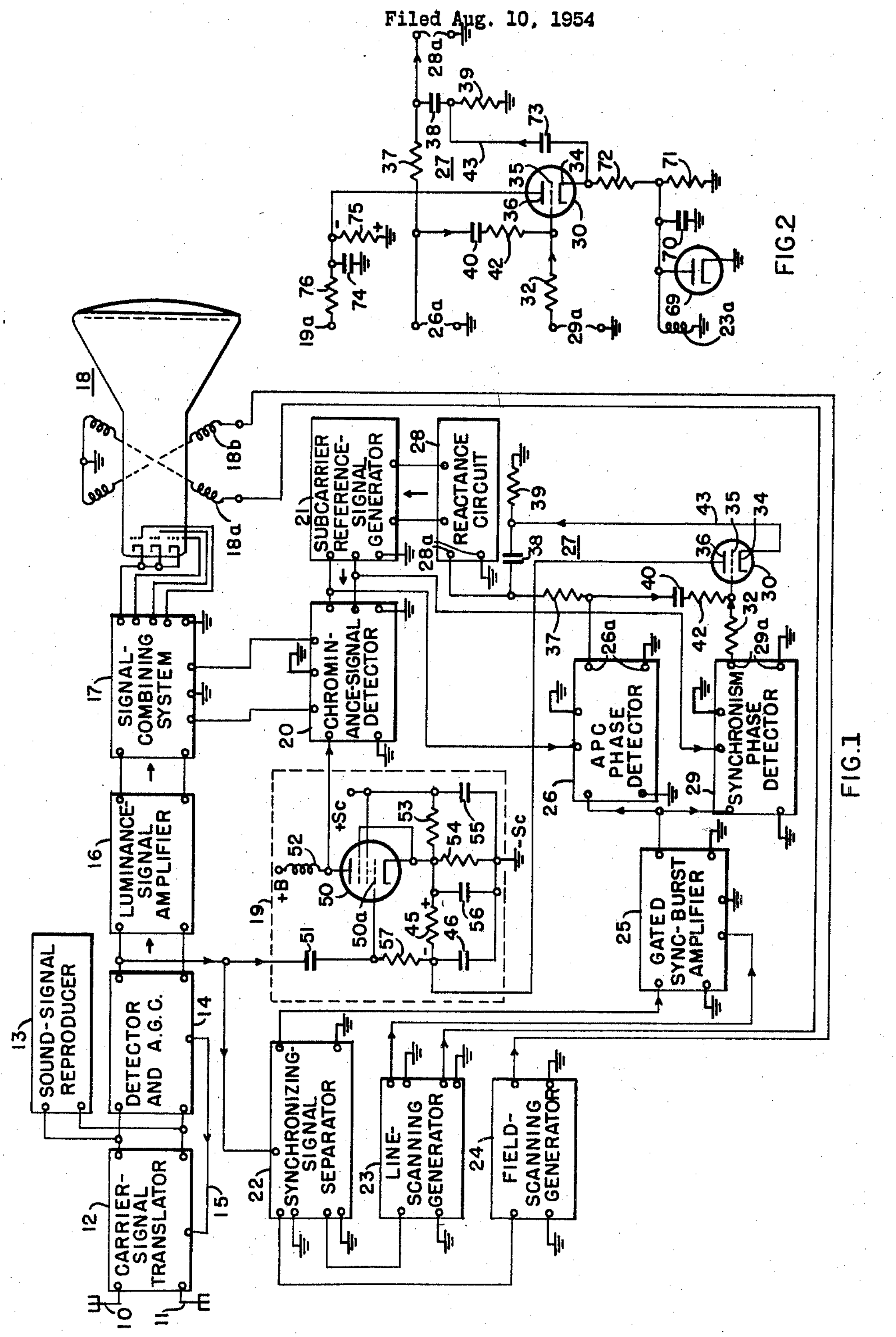

This invention relates to switching circuits for color-television receivers and, particularly, to switching circuits useful in the color-synchronizing systems of such receivers.

In accordance with the FCC approved NTSC signal specification described on pages 17–19, inclusive, of the January 1954 issue of the Proceedings of the I. R. E., the composite color-television signal includes luminance- and chrominance-signal components, the chrominance component being carried as amplitude and phase modulation of a 3.58 megacycle subcarrier signal. The chrominance signal conveys the color information concerning the scene to be reproduced by the receiver. To convert the chrominance signal to the desired color signals, it is common practice to utilize synchronous detectors. For proper operation, such detectors individually require a locally generated subcarrier reference signal having the proper frequency and phase relationship with respect to the frequency and phase of the received chrominance subcarrier signal. For this reason, the composite color-television signal also includes periodic bursts of a sub-carrier-frequency synchronizing signal. As a result, it is common practice to utilize an automatic-phase-control (APC) system for synchronizing the subcarrier reference-signal generator with the received synchronizing or sync burst signal.

Conventional APC systems have inherent noise rejection and pull-in time limitations which are undesirable for many applications as described in a recent article by Donald Richman entitled "Color-carrier reference phase synchronization accuracy in NTSC color television" and appearing at page 106 of the January 1954 issue of the Proceedings of the I. R. E. In order to overcome these limitations, an improved system of color synchronization has been proposed by Donald Richman which is described in his recent article entitled "The DC quadricorrelator: a two-mode synchronization system" appearing at page 288 of the January 1954 issue of the Proceedings of the I. R. E. and is disclosed and claimed in his copending application Serial No. 368,067, entitled "Control Apparatus for Color-Television Receiver," filed July 15, 1953. The quadricorrelator color-synchronizing system combines the advantage of good noise rejection and, hence, a high degree of synchronization accuracy with the advantage of rapid pull-in time even where the initial frequency difference between the reference-signal generator and the received sync burst signal is considerable. The present invention relates to switching circuits that are particularly useful in DC quadricorrelator color-synchronizing systems to reduce the number of circuit components commonly utilized in embodiments of such D. C. quadricorrelator systems heretofore disclosed.

It is an object of the invention, therefore, to provide a new and improved switching circuit for use in the color-synchronizing system of a color-television receiver.

It is a further object of the invention to provide a new and improved switching circuit for reducing the number of components required in, and thus the cost of, embodiments of D. C. quadricorrelator color-synchronizing systems heretofore proposed.

In accordance with the invention, in a color-television receiver having a chrominance channel and a color-synchronizing system having first and second operating modes for synchronizing a reference-signal generator of the receiver with a received color-synchronizing signal and including an automatic-phase-control filter, a switching circuit comprises supply circuit means for supplying a control signal representative of the state of synchronism of the reference-signal generator. The switching circuit also includes an electron-discharge device responsive to the control signal and operative in a first conductivity condition when the reference-signal generator is approximately in synchronism with the received signal and operative in a second conductivity condition when the reference-signal generator is not approximately in synchronism with the received signal. The switching circuit also includes an alternating-current path coupled from an input terminal of the automatic-phase-control filter to an output terminal of the filter and responsive to the conductivity conditions of the electron-discharge device to determine the operating mode of the color-synchronizing system. The switching circuit additionally includes circuit means responsive to the conductivity conditions of the electron-discharge device to control the operating mode of the chrominance channel.

For a better understanding of the present invention, together with other and further objects thereof, reference is had to the following description taken in connection with the accompanying drawing, and its scope will be pointed out in the appended claims.

Referring to the drawing:

Fig. 1 is a circuit diagram, partly schematic, of a complete color-television receiver including a switching circuit constructed in accordance with the present invention, and Fig. 2 is a circuit diagram of a modification of the switching circuit of Fig. 1.

*Description and operation of color-television receiver of Fig. 1*

Referring to the drawing, the color-television receiver there represented comprises an antenna system 10, 11 of conventional construction for supplying a received composite color-television signal to a carrier-signal translator 12. The carrier-signal translator 12 may include, for example, a radio-frequency amplifier, an oscillator-modulator, and an intermediate-frequency amplifier all of conventional construction. These units serve to amplify the received composite signal and change its carrier frequency to an intermediate-frequency value. The intermediate-frequency composite signal is, in turn, supplied to a sound-signal reproducer 13 which is effective to extract the sound carrier therefrom, detect the audio component thereof, and utilize the same to reproduce sound. To this end, the sound-signal reproducer 13 may include a sound intermediate-frequency amplifier, a frequency-modulation signal detector, an audio-frequency amplifier, and a loudspeaker all of conventional construction.

The intermediate-frequency composite signal is also supplied to a detector and AGC unit 14 of conventional construction. The AGC portion of unit 14 is effective to supply a control voltage to appropriate stages of the carrier-signal translator 12 by means of conductor 15 for controlling the gain of those stages in a conventional manner. The detector portion of unit 14 serves to extract the composite video-frequency signal from the intermediate-frequency composite signal and supply the composite video signal to a luminance-signal amplifier 16 of conventional construction. The luminance-signal amplifier 16, in turn, supplies the luminance-signal component of the composite video signal to a conventional signal-combining system 17 which, in turn, is coupled to a conventional tricolor shadow mask picture tube 18.

The color-television receiver also includes a chrominance-signal channel for translating the chrominance-signal component of the composite color-television signal supplied thereto by the detector 14, the chrominance-signal channel including a pass-band chrominance amplifier 19 which, in turn, is coupled in cascade with a chrominance-signal detector 20 and the signal-combining system 17. The chrominance-signal detector 20 may include, for example, a pair of synchronous detectors of conventional construction for deriving the desired color-difference signals from the chrominance signal supplied thereto by the chrominance amplifier 19. Coupled to the chrominance-signal detector 20 is a subcarrier reference-signal generator 21 which may include, for example, an oscillator and suitable phase-shifting networks and is effective to supply in-phase and quadrature-phase subcarrier-frequency reference signals to the synchronous detectors of the chrominance-signal detector 20 for enabling detection of the color-difference signals. The color-difference signals from the detector 20 are supplied to the signal-combining system 17 which is effective to combine the color-difference signals with the luminance signal to derive the desired red, green, and blue color signals which, in turn, are supplied to the corresponding red, green, and blue control electrodes of the picture tube 18. The signal-combining system 17 may include, for example, suitable inverting and matrixing circuits of conventional construction.

The composite video signal from the detector 14 is also supplied to a synchronizing-signal separator 22 which is effective to separate the color-synchronizing, line-synchronizing, and field-synchronizing components from the composite video signal and from each other. The line-synchronizing component is supplied to a conventional line-scanning generator 23 and is effective to control the generation of suitable recurrent line-scanning signals therein. These line-scanning signals are, in turn, supplied to an appropriate deflection winding 18a associated with picture tube 18. In a like manner, the field-synchronizing signals are supplied to a conventional field-scanning generator 24 and are effective to control the generation of field-scanning signals therein which, in turn, are supplied to an appropriate deflection winding 18b also associated with the picture tube 18.

The color-synchronizing or sync burst signal separated from the composite video-frequency signal by the separator 22 is supplied to a quadricorrelator color-synchronizing system including, for example, units 25–29, inclusive. More precisely, the sync burst signal is supplied through a gated sync burst amplifier 25 to an APC phase detector 26 which may be of the balanced diode type. Pulses generated in the line-scanning generator 23 during retrace intervals are supplied by the generator 23 to gate the amplifier 25 to a translatory condition only during the occurrence of the sync burst signal. The phase detector 26 is also coupled to the subcarrier reference-signal generator 21 for receiving a quadrature-phase subcarrier-frequency reference signal therefrom and is responsive to this reference signal and to the received synchronizing signal supplied by the amplifier 25 to produce a pulsating phase-control signal which is representative of the phase difference of the reference signal from the desired quadrature relationship with the received synchronizing signal. This phase-control signal is then supplied to a conventional APC filter 27 which develops therefrom an error signal which, in turn, is supplied to a conventional reactance tube circuit 28 which is responsive thereto to control the operating phase and frequency of the oscillator of generator 21.

The sync burst signal is also supplied to a mode-control or synchronism phase detector 29 which may be of the balanced diode type. An in-phase subcarrier-frequency reference signal from the generator 21 is also supplied to the detector 29. In response to these signals, the detector 29 develops a unidirectional mode-control signal having, for example, a relatively large negative value when the generator 21 and the received sync burst signal are approximately in synchronism and having approximately zero magnitude when the generator 21 and the sync burst signal are not approximately in synchronism. This mode-control signal is, in turn, supplied to a switching tube 30 and associated circuitry which is effective in accordance with the present invention, as will be mentioned more fully hereinafter, to control the transmission characteristics of the APC filter 27 to control the operating mode of the synchronizing system. In this manner, the quadricorrelator synchronizing system is enabled to have a hold-in operating mode giving good synchronizing accuracy and noise-rejection characteristics and to have an increased sensitivity pull-in operating mode having a very rapid pull-in time even where the frequency of the oscillator of generator 21 differs considerably from that of the received sync burst.

The antenna system 10, 11 and the units 12–29, inclusive, with the exception of the chrominance amplifier 19, may be of conventional construction and operation, when taken individually, so that a detailed description and explanation of the operation thereof are unnecessary herein.

*Description of switching circuit of Fig. 1*

Referring to Fig. 1 of the drawing, in a color-television receiver having a chrominance channel including, for example, units 19 and 20 and a color-synchronizing system including, for example, units 25–29, inclusive, having first and second operating modes for synchronizing a reference-signal generator 21 of the receiver with a received color-synchronizing signal, there is represented a switching circuit constructed in accordance with the present invention. The switching circuit comprises supply circuit means for supplying a control signal representative of the state of synchronism of the reference-signal generator 21. The supply circuit means may include, for example, the synchronism phase detector 29 and an isolating resistor 32. The switching circuit further includes an electron-discharge device 30 responsive to the control signal and operative in a first conductivity condition when the reference-signal generator 21 is approximately in synchronism with the received signal and operative in a second conductivity condition when the reference-signal generator 21 is not approximately in synchronism with the received signal. The switching device 30 preferably comprises an electron-discharge tube having a cathode 34, an anode 36, and a control electrode 35 connected, for example, through the isolating resistor 32 to the output circuit of the synchronism phase detector 29.

The switching circuit also includes an alternating-current path coupled from an input terminal of the automatic-phase-control (APC) filter 27 to an output terminal of the filter 27 and responsive to the conductivity conditions of the electron-discharge device 30 to determine the operating mode of the color-synchronizing system. The APC filter 27, which serves to develop an error signal for controlling the reference-signal generator 21, includes a resistor 37, a condenser 38, and a resistor 39. The alternating-current path for translating an alternating-current component comprises the following: a condenser 40 connected to an input terminal of the filter 27 and connected through a direct-current isolating resistor 42 to the control electrode 35 of tube 30; the control electrode 35 to cathode 34 space-current path of tube 30; and a conductor 43 connected to the cathode 34 and coupled to an intermediate terminal of the filter 27. This alternating-current path is enabled by the conductive condition of the tube 30 to increase the magnitude of the error signal supplied to the reference-signal generator 21 to cause the color-synchronizing system to operate in a particular one of its modes.

The switching circuit additionally includes circuit means responsive to the conductivity conditions of the electron-discharge device 30 to control the operating mode of the chrominance channel. This circuit means may include, for example, a resistor-condenser filter circuit comprising a resistor 45 and a condenser 46 included, for simplicity of circuitry, in the chrominance amplifier 19. The resistor-condenser filter 45, 46 is connected to the anode 36 of the switching tube 30 and is effective, when the tube 30 is conductive, to develop a negative bias voltage to disable or bias off the chrominance channel.

The chrominance amplifier 19, in addition to the resistor-condenser filter 45, 46, includes, for example, a conventional amplifier tube 50 having a control electrode 50*a* coupled through a coupling condenser 51 to the output circuit of the detector unit 14 and having an anode load circuit 52 coupled to the input circuit of the chrominance-signal detector 20. Coupled across a source of screen-electrode potential $+C_c$, $-S_c$ is a voltage divider comprising resistors 53 and 54 which furnish the proper operating bias for the tube 50 and also the proper anode potential for the switching tube 30. The screen electrode and cathode of tube 50 are suitably by-passed for alternating-signal components by means of the alternating-current by-pass condensers 55 and 56. The control electrode 50*a* of tube 50 is suitably coupled to the cathode through a grid-leak resistor 57 and the resistor 45.

*Operation of switching circuit of Fig. 1*

In considering the operation of the Fig. 1 switching circuit, it will be assumed initially that the color-synchronizing system is operating in the hold-in mode, that is, the reference-signal generator 21 is approximately in synchronism with the received sync burst signal. In this condition, the synchronism phase detector 29 supplies a relatively large negative potential to the control electrode 35 of the switching tube 30 to maintain that tube nonconductive. As a result, the alternating-current path including condenser 40, resistor 42, and conductor 43 has no effect on the APC filter 27 and the filter develops error signals from the signals supplied thereto by the APC phase detector 26 in a conventional manner. In this operating mode, the color-synchronizing system has highly desirable noise-rejection characteristics due to the low-pass frequency characteristics of the filter 27. However, where the operating frequency of the reference-signal generator 21 differs by a considerable amount, for example, 1 kilocycle from the frequency of the received sync burst signal, the time required for the system to pull the signal-generator frequency into synchronism with the received sync burst is undesirably excessive, for example, of the order of a number of seconds. As indicated by either of the mentioned articles by Richman, this pull-in time becomes considerably greater for further increases in frequency difference.

During the hold-in operating mode, no anode current for the switching tube 30 is required so that essentially no current flows through resistor 45 of the resistor-condenser filter 45, 46 thus permitting the normal bias voltages of the chrominance amplifier tube 50 to maintain the tube conductive. In this condition, the chrominance amplifier 19 is effective to amplify and translate the chrominance signal from the video detector 14 to the chrominance detector 20.

When the color-synchronizing system is operating in the pull-in mode, that is, when the reference-signal generator 21 is not approximately in synchronism with the received sync burst signal, then the mode-control signal from the synchronism phase detector 29 falls to, for example, approximately zero value which enables the switching tube 30 to become conductive. When the tube 30 is conductive, the alternating-current path 40, 42, 43 is enabled to present a relatively low impedance alternating-current path around the APC filter 27. This increases the alternating-current gain of the APC filter 27 and thereby increases the alternating-current gain of the control loop represented by the APC phase detector 26, the APC filter 27, the reactance circuit 28, and the reference-signal generator 21, an output signal of which is supplied back to the APC phase detector 26 to close the loop. As indicated in the first-mentioned Richman article, increasing the alternating-current gain of such a control loop causes the phase detector 26 and APC filter 27 of the loop to develop a larger direct-current control signal for a given frequency error thus increasing the control sensitivity of the control loop to frequency errors. This increased sensitivity serves to decrease considerably the time required to cause the reference-signal generator 21 to pull into synchronism with the received sync burst signal. Changing the transmission characteristics of the filter 27 in this manner temporarily degrades the effective noise-rejection characteristics of the system during synchronization but subtantially improves the pull-in even during noisy operating conditions.

Conduction in the switching tube 30 also causes anode current of tube 30 to flow through the resistor 45 of the resistor-condenser filter 45, 46 coupled in the chrominance amplifier 19. In this manner, sufficient negative bias is developed across the resistor 45 to render the chrominance amplifier tube 50 nonconductive, thereby to render the chrominance channel nontranslatory. This is desirable because when the color receiver is receiving a monochrome signal instead of a color signal, there is no received sync burst to cause synchronism of the reference oscillator. In this manner, spurious signals are prevented from occurring in the chrominance channel during monochrome reception. In addition, during reception of a color signal it prevents presentation of the color aspects of the received color signal during the frequency pull-in periods thus permitting the viewer to see during any such periods a pleasing monochrome picture instead of a distorted color picture.

*Description and operation of modified switching circuit of Fig. 2*

Referring now to Fig. 2 of the drawing, there is represented schematically another embodiment of the invention which is adapted to be connected to the corresponding terminals 26*a*, 23*a*, and 29*a* of the appropriate units of the Fig. 1 television receiver. This modified form of the switching circuit is similar to that of Fig. 1 and corresponding circuit elements are indicated by the same reference numerals. The switching circuit of Fig. 2 differs from that of Fig. 1 in the manner of supplying the operating potential to the switching tube 30 and of supplying the negative bias to the chrominance amplifier 19.

In the Fig. 2 embodiment, the operating potential is obtained for the switching tube 30 by applying a suitable negative potential to the cathode 34 thereof instead of supplying a suitable positive potential to the anode 36 as was done in the Fig. 1 circuit. The negative operating potential may be developed, for example, by applying negative-polarity flyback pulses from a transformer winding **23*a* associated with an output transformer of the line-scanning generator 23 of Fig. 1 to a rectifier 69 and a smoothing filter comprising a condenser 70 and a resistor 71. The smoothing filter 70, 71 is effective to develop a relatively steady negative-polarity direct-current potential which is supplied through an isolating resistor 72 to the cathode 34 to furnish the desired operating potential for the switching tube 30. Where the operating potential is supplied to the tube 30 in this manner, it is necessary that a blocking condenser 73 be coupled in the alternating-current path between the cathode 34 and the conductor 43 in order that the direct-current operating potential for tube 30 is not supplied to the APC filter 27** and the units of the synchronizing system coupled thereto.

For the Fig. 2 switching circuit, the anode 36 of the switching tube 30 is connected to a resistor-condenser smoothing filter comprising a condenser 74 and a resistor 75. Conduction in the tube 30, when the reference-signal generator 21 is not approximately in synchronism with the received sync burst signal, causes anode current for the switching tube 30 to flow through the resistor 75 of the resistor-condenser filter 74, 75 to develop a negative bias potential thereacross. This negative bias potential is then supplied through an isolating resistor 76 and the terminal 19*a* to the control electrode 50*a* of the chrominance amplifier tube 50 to render that tube nonconductive during the desired operating mode of the synchronizing system.

From the foregoing description, it will be apparent that the switching circuit constructed in accordance with a preferred form of the present invention has the advantage of being a one-tube switching circuit which performs two switching functions, namely, controlling the alternating-current transmission characteristics of the APC filter and controlling the conductivity condition of the chrominance amplifier of the chrominance channel. In systems heretofore proposed, these functions have been performed by two separate single-tube switching circuits. The switching circuit of the present invention, therefore, eliminates the need for several of the circuit components required in prior systems.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color-television receiver having a chrominance channel and a quadricorrelator color-synchronizing system having pull-in and hold-in operating modes and including an automatic-phase-control filter, a switching circuit comprising: a mode-control phase detector for supplying a control signal representative of the state of synchronism of a subcarrier reference-signal generator; an electron-discharge tube having a control electrode coupled to the mode-control phase detector and responsive to the control signal for causing the tube to be nonconductive during the hold-in mode and conductive during the pull-in mode; an alternating-current path coupled from an input terminal of the automatic-phase-control filter, through the control electrode to cathode space-current path of the tube, to an output terminal of the filter and effective, when the tube is conductive, to increase the alternating-current transmission characteristic of the filter to cause the synchronizing system to operate in the pull-in mode; and a filter network connected to the anode of the tube and effective, when the tube is conductive, to develop a bias voltage to disable the chrominance channel.

2. In a color-television receiver having a chrominance channel and a color-synchronizing system having first and second operating modes for synchronizing a reference-signal generator of the receiver with a received color-synchronizing signal and including an automatic-phase-control filter, a switching circuit comprising: supply circuit means for supplying a control signal representative of the state of synchronism of said reference-signal generator; an electron-discharge device responsive to said control signal and operative in a first conductivity condition when said reference-signal generator is approximately in synchronism with said received signal and operative in a second conductivity condition when said reference-signal generator is not approximately in synchronism with said received signal; an alternating-current path coupled from an input terminal of the automatic-phase-control filter to an output terminal of the filter and responsive to the conductivity conditions of said electron-discharge device to determine the operating mode of said color-synchronizing system; and circuit means responsive to the conductivity conditions of said electron-discharge device to control the operating mode of said chrominance channel.

3. In a color-television receiver having a chrominance channel and a color-synchronizing system having pull-in and hold-in operating modes for synchronizing a reference-signal generator of the receiver with a received color-synchronizing signal and including an automatic-phase-control filter, a switching circuit comprising: supply circuit means for supplying a control signal representative of the state of synchronism of said reference-signal generator; an electron-discharge device responsive to said control signal and operative in a nonconductive condition during said hold-in mode when said reference-signal generator is approximately in synchronism with said received signal and operative in a conductive condition during said pull-in mode when said reference-signal generator is not approximately in synchronism with said received signal; an alternating-current path coupled from an input terminal of the automatic-phase-control filter to an output terminal of the filter and responsive to the nonconductive condition of said electron-discharge device for developing a relatively poor alternating-current transmission characteristic to cause said color-synchronizing system to operate in said hold-in mode and responsive to the conductive condition of said electron-discharge device for developing a relatively good alternating-current transmission characteristic to cause said color-synchronizing system to operate in said pull-in mode; and circuit means responsive to the nonconductive condition of said electron-discharge device to enable said chrominance channel to translate chrominance signals and responsive to the conductive condition of said electron-discharge device to render said chrominance channel nontranslatory.

4. In a color-television receiver having a chrominance channel and a color-synchronizing system having first and second operating modes for synchronizing a reference-signal generator of the receiver with a received color-synchronizing signal and including an automatic-phase-control filter for developing an error signal for controlling the signal generator, a switching circuit comprising: supply circuit means for supplying a control signal representative of the state of synchronism of said reference-signal generator; an electron-discharge device having cathode, control electrode, and anode and responsive to said control signal and operative in a first conductivity condition when said reference-signal generator is approximately in synchronism with said received signal and operative in a second conductivity condition when said reference-signal generator is not approximately in synchronism with said received signal; an alternating-current path, including the control electrode to cathode space-current path of said electron-discharge device, coupled across a portion of said automatic-phase-control filter and responsive to one of the conductivity conditions of said electron-discharge device for enabling said alternating-current path to increase the magnitude of the error signal supplied to said signal generator to cause said color-synchronizing system to operate in a particular one of said modes; and circuit means responsive to the conductivity conditions of said electron-discharge device to control the operating mode of said chrominance channel.

5. In a color-television receiver having a chrominance channel and an automatic-phase-control type of color-synchronizing system having first and second operating modes for synchronizing a reference-signal generator of the receiver with a received color-synchronizing signal and including an automatic-phase-control filter for developing an error signal for controlling the signal generator, a switching circuit comprising: supply circuit means for supplying a unidirectional control signal representative of the state of synchronism of said reference-signal generator; an electron-discharge device having cathode, control electrode, and anode, said control electrode being connected to said supply circuit means and said electron-discharge device being responsive to said unidirectional control signal and operative in a first conductivity condition when said reference-signal generator is approximately in synchronism with said received signal and operative in a second conductivity condition when said reference-signal generator is not approximately in synchronism with said received signal; an alternating-current path including a condenser connected to an input terminal of said automatic-phase-control filter and connected through a direct-current isolating resistor to said control electrode, the control electrode to cathode space-current path of said electron-discharge device, and a conductor connected to said cathode and coupled to an output terminal of said filter, said path being enabled by one of the conductivity conditions of said electron-discharge device to increase the magnitude of the error signal supplied to said signal generator to cause said color-synchronizing system to operate in a particular one of said modes; and a resistor-condenser filter circuit connected to said anode and responsive to the conductivity conditions of said electron-discharge device to develop corresponding direct-current control signals to control the operating mode of said chrominance channel.

References Cited in the file of this patent

UNITED STATES PATENTS 2,744,155 Kihn ------------------ May 1, 1956

OTHER REFERENCES

Color TV, Rider Publication, March 1954, pages 141, 142. (Copy in Division 16.)

Two-Color Receiver, RCA, November 1949, pages 9, 10. (Copy in Division 16.)

Introduction to Color Television, Admiral Corp., February 1954. (Copy in Division 16.)